United States Patent
Watanabe

[11] Patent Number: 5,228,377
[45] Date of Patent: Jul. 20, 1993

[54] BRAKE BOOSTER
[75] Inventor: Makoto Watanabe, Saitama, Japan
[73] Assignee: Jidosha Kiki Co., Ltd., Tokyo, Japan
[21] Appl. No.: 904,449
[22] Filed: Jun. 25, 1992
[30] Foreign Application Priority Data Jul. 19, 1991 [JP] Japan .................................. 3-203187

[51] Int. Cl.⁵ .............................................. F15B 9/10
[52] U.S. Cl. ..................... 91/376 R; 92/48; 92/98 R
[58] Field of Search ............... 91/376 R, 533, 369.2; 92/48, 98 R, 169.1

[56] References Cited
U.S. PATENT DOCUMENTS

| | | | |
|---|---|---|---|
| 3,013,533 | 12/1961 | Brown | 91/376 R X |
| 3,159,975 | 12/1964 | Ayers, Jr. | 91/376 R |
| 4,499,812 | 2/1985 | Pressaco et al. | 91/376 R |
| 4,667,471 | 5/1987 | Fulmer et al. | |
| 4,966,248 | 10/1990 | Farr | |

Primary Examiner—Edward K. Look
Assistant Examiner—Todd Mattingly
Attorney, Agent, or Firm—Flynn, Thiel, Boutell & Tanis

[57] ABSTRACT

A brake booster provided with a function to serve as an automatic brake is disclosed. Bellows disposed within a shell has a rear bead which is axially held sandwiched between an annular recess formed in the inner periphery of a front power piston and a retainer which is a press fit over the outer periphery of a valve body. When the atmosphere is introduced into an internal space defined within the bellows to operate the brake booster as an automatic brake, the bellows tends to expand, whereby the rear bead becomes pulled axially and radially. However, a displacement of the rear bead is prevented by being held between the annular recess in the front power piston and the retainer, thereby effectively preventing a failure of a hermetic seal in the region where the rear bead is connected.

12 Claims, 3 Drawing Sheets

BRAKE BOOSTER

FIELD OF THE INVENTION

The invention relates to a brake booster, and more particularly, to an improvement of a brake booster provided with a function to serve as an automatic brake.

DESCRIPTION OF THE PRIOR ART

A brake booster provided with a function to serve as an automatic brake and comprising a valve body slidably disposed within a shell, a power piston disposed on the valve body, a constant and a variable pressure chamber formed across the power piston, a constant pressure passage formed in the valve body to provide a communication between the constant pressure chamber and a valve mechanism which switches a fluid circuit and for providing a communication between the constant and the variable pressure chamber through the valve mechanism and a variable pressure passage, and bellows disposed within the constant pressure chamber and having its rear opening connected to the constant pressure passage and its front end connected to the shell, with a negative pressure or an atmosphere selectively supplied to the internal space within the bellows is known in the art, as disclosed in U.S. Pat. No. 4,966,248, for example.

In the brake booster disclosed in the above U.S. Patent, an atmosphere may be introduced into the variable pressure chamber by supplying the atmosphere into the bellows, thereby actuating the brake booster without depressing a brake pedal.

Another brake booster provided with a function to serve as an automatic brake is also disclosed in U.S. Pat. No. 4,667,471.

In the brake booster disclosed in the first citation, the connection of the rear end of the bellows to the constant pressure passage takes place as follows: Specifically, an annular groove is formed around the outer periphery of the valve body at a location rearward of a location where the front end of the constant pressure passage opens thereinto, and the rear end of the bellows is fitted into the annular groove by utilizing its own resilience, thereby maintaining a hermetic seal in this region.

However, when the atmosphere is introduced into the bellows to cause the brake booster to function as an automatic brake, the entire bellows will tend to expand radially outward, whereupon the rear end of the bellows which is fitted in the annular groove formed in the valve body will be pulled in both axial direction and radially outward. Accordingly, the disclosed brake booster suffers from the likelihood of causing a failure of the hermetic seal or leak from the region where the rear end thereof is connected upon introducing the atmosphere into the bellows, inasmuch as the own resilience of the bellows is all that is effective to maintain the rear end thereof in fitted engagement with the groove in the valve body.

SUMMARY OF THE INVENTION

In view of the foregoing, the invention relates to a brake booster comprising a valve body slidably disposed within a shell, a power piston mounted on the valve body, a constant and a variable pressure chamber formed across the power piston, a constant pressure passage formed in the valve body for providing a communication between the constant pressure chamber and a valve mechanism which switches a fluid circuit and for providing a communication between the constant and the variable pressure chamber through the valve mechanism and a variable pressure passage, and bellows disposed within the constant pressure chamber and having its rear opening connected to the constant pressure passage and its front end connected to the shell, with a negative pressure or an atmosphere being selectively supplied to the internal space within the bellows. In accordance with the invention, the rear end of the bellows is formed as a thick bead, and an annular recess is formed around the inner periphery of the power piston toward its front end, in which the bead extending around the bellows is fitted. An annular retainer is disposed as a press fit around the outer periphery of the valve body as inserted from the front side thereof so as to abut against the bead of the bellows, thus preventing the disengagement of the bead.

According to another feature of the invention, the brake booster of the type described above is further characterized in that a flange extends radially outward from the outer periphery of the valve body toward its front end, and the inner periphery of the power piston is fitted over the valve body from the rear side when the bead extending around the bellows is fitted in the annular recess formed in the power piston so that the bead of the bellows is axially held sandwiched between the annular recess in the power piston and the rear end face of the flange extending from the valve body. The inner periphery of the power piston is secured to the outer periphery of the valve body by securing means so as to maintain the both members in this relationship.

According to a further feature of the invention, the front end of the constant pressure passage opens into the front end face of the valve body, and there is provided a spring between the shell and the valve body for urging the valve body rearward. In this embodiment, the rear end of the bellows is again formed as a thick bead, which is fitted into an opening formed in the valve body which provides the front end of the constant pressure passage. Under this condition, the bead is disposed in abutment against the inner peripheral surface of the opening in the valve body by means of a locking step formed on the front end of the retainer to prevent the bead from being disengaged toward the front side. In addition, the rear end of the retainer is interposed between the spring and the valve body and thus is secured to the valve body. In this manner, a failure of the hermetic seal around the rear end of the bellows is prevented in a favorable manner if the bellows tends to expand upon introducing the atmosphere into the internal space within the bellows.

It will be appreciated that according to the fundamental arrangement of the invention, if the rear end of the bellows tends to be pulled both axially and radially upon introducing the atmosphere into the internal space within the bellows, the rear end of the bellows is located within the annular formed in the inner periphery of the power piston and is held in place by the retainer, which prevents the rear end from being displaced in either radially outward direction or in the axial direction, thus preventing a failure of the hermetic seal in the region where the rear end of the bellows is connected, in a favorable manner.

Above and other objects, features and advantages of the invention will become apparent from the following description of several embodiments thereof with reference to the attached drawings.

DETAILED DESCRIPTION OF EMBODIMENTS

Figure 1:
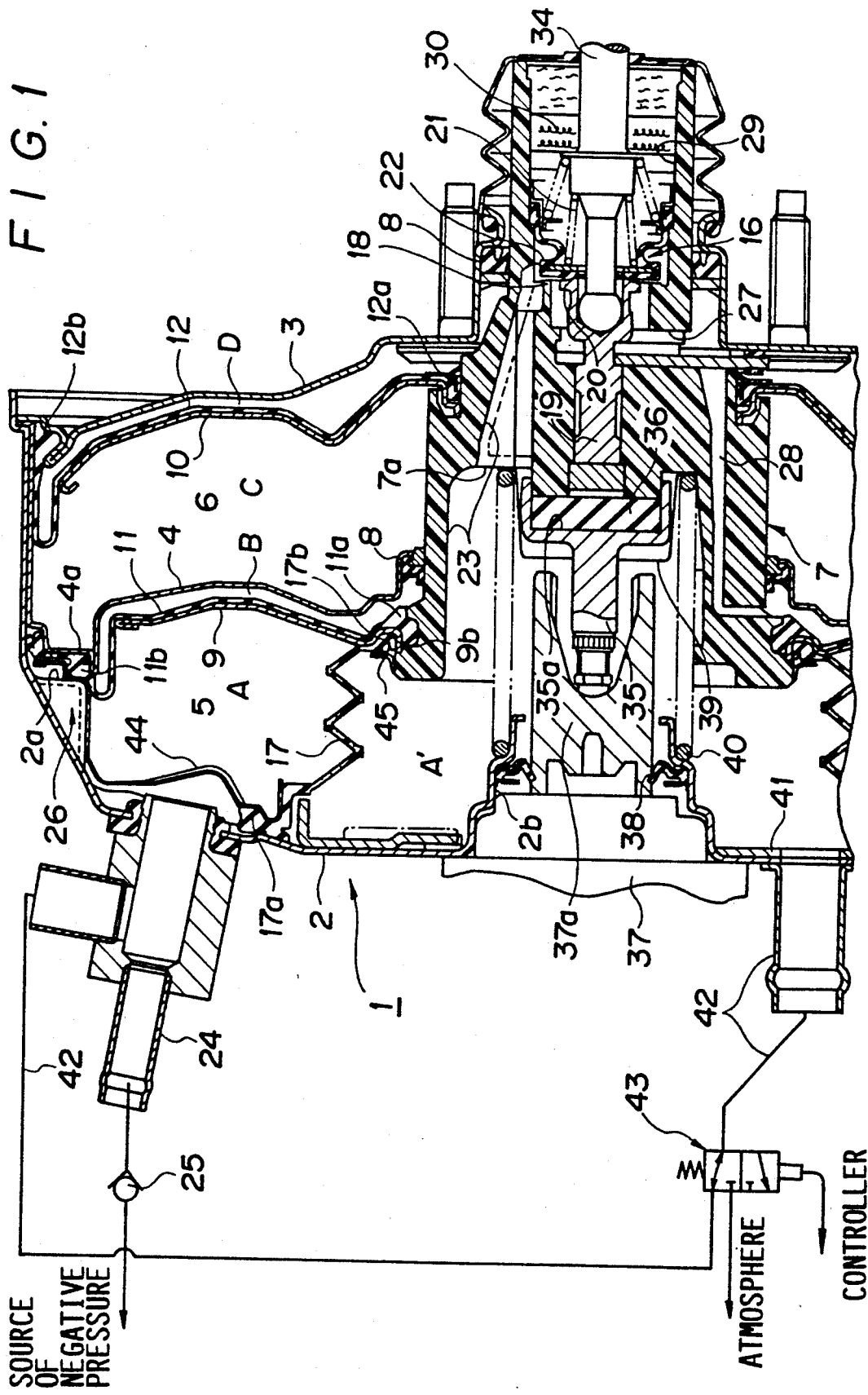
FIG. 1 is a longitudinal section of one embodiment of the invention.

Referring to the drawings, several embodiments of the invention will now be described. Initially referring to FIG. 1, there is shown a brake booster of tandem type including a shell 1, which is defined by connecting a front shell 2 and a rear shell 3 together. The interior of the shell 1 is divided by a centerplate 4 into a forwardly located, front chamber 5 and a rearwardly located rear chamber 6.

Axial portions of the centerplate 4 and the rear shell 3 are formed with through-openings, through which a valve body 7 in the form of a stepped cylinder slidably extends, with seal members 8 maintaining a hermetic seal between the respective openings and the valve body 7.

A front and a rear power piston 9, 10 are disposed in the front and the rear chamber 5, 6, respectively. The inner periphery of each power piston 9 or 10 is connected to the outer periphery of the valve body 7, and a front and a rear diaphragm 11, 12 are applied to the back surfaces of the respective power pistons 9, 10. Each diaphragm 11, 12 includes a bead 11a, 12a extending around its inner periphery, which is also connected to the outer periphery of the valve body 7. The front diaphragm 11 also includes a bead 11b which extends around the outer periphery thereof, and which is axially held sandwiched between an annular wall 2a of the front shell 2 and an opposing wall 4a of the centerplate 4. In this manner, the front diaphragm 11 partitions the interior of the front chamber 5 into a forwardly located, constant pressure chamber A and a rearwardly located, variable pressure chamber B. Also, the rear diaphragm 12 includes a bead 12b extending around the outer periphery thereof, which is held sandwiched by portions of the front and the rear shell 2, 3 where they are connected together. The rear diaphragm 12 also partitions the interior of the rear chamber 6 into a forwardly located, constant pressure chamber C and a rearwardly located, variable pressure chamber D.

A valve mechanism 16, which is constructed in a manner well known in the art, is disposed within the valve body 7. Neglecting for the moment the provision of bellows, to be described later, the valve mechanism 16 is capable of functioning to switch a fluid circuit between the two constant pressure chambers A, C and two variable pressure chambers B, D. Specifically, the valve mechanism 16 comprises an annular first valve seat 18 formed on the valve body 7, an annular second valve seat 20 formed on the right end of a valve plunger 19 which is slidable within the valve body 7, at a location radially inward of the first valve seat 18, and a valve element 12 which is adapted to be seated upon either seat 18 or 20 from the right, as viewed in FIG. 1, under the resilience of a spring 21.

A space located radially outward of a first seal defined by the engagement of the valve element 22 with the first valve seat 18 communicates with the constant pressure chamber A through an axially extending, first constant pressure passage 23 which is formed in the valve body 7, assuming that bellows 17 is not provided. A negative pressure from a suitable source of negative pressure is adapted to be introduced into the constant pressure chamber A through a first negative pressure introducing piping 24 connected to the front shell 2, with a check valve 25 disposed between the source and the piping 24 to allow a fluid flow only in a direction from the source toward the constant pressure chamber A. The constant pressure chamber A is maintained in communication with the constant pressure chamber C defined within the rear chamber through a second constant pressure passage 26 which is defined radially outside the bead 11b of the front diaphragm 11. Accordingly, a negative pressure is normally introduced into the both constant pressure chambers A and C.

On the other hand, a space located radially inward of the first seal defined by the engagement between the valve element 22 and the first valve seat 18 and radially outward of an annular second seal defined by the engagement of the valve element 22 with the second valve seat 20, or a space located intermediate the both annular seals communicates with the variable pressure chamber D through a radially extending first variable pressure passage 27 which is formed in the valve body 7, and thence communicates with the variable pressure chamber B through an axially extending second variable pressure passage 28 which is also formed in the valve body 7.

Finally, a space located radially inward of the inner or second annular seal defined by the engagement of the valve element 22 with the second valve seat 20 communicates with the atmosphere through a pressure passage 29 formed in the valve body 7 and a filter 30 disposed therein.

The right end of the valve plunger 19 which is slidably disposed within the valve body 7 is connected to an input shaft 34 which is mechanically coupled to a brake pedal, not shown, while its left end is disposed in opposing relationship with the right end face of a reaction disc 36 which is received in a recess 35a formed in one end of a push rod 35. The left end of the rod 35 is mechanically coupled to a piston 37a associated with a master cylinder 37 which extends through an axial opening 2b formed in the front shell 2. A seal member 38 maintains a hermetic seal between the opening 2b and the piston 37a.

A cup-shaped retainer 39 is fitted, from the front side, over the end of the push rod 35 in which the recess 35a is formed and includes a rear end extending radially outward and which is disposed in abutment against a stepped end face 7a of the valve body 7 formed around its inner periphery. A return spring 40 extends between the front shell 2 and this end of the retainer 39 as it abuts against the stepped end face 7a to maintain the valve body 7 in its inoperative position shown. Since the return spring 40 is effective to maintain the rear end of the retainer 39 in abutting relationship against the stepped end face 7a and thus is connected thereto, the withdrawal of the push rod 35 from the valve body 7 is prevented.

Bellows 17, formed of rubber, extends between the wall surface of the front shell 2 and the outer periphery of the valve body 7 at its front end, and defines an internal space A' which communicates with the source of negative pressure through openings formed in a reinforcing plate 41 and the wall of the front shell 2 and through a second negative pressure introducing piping 42 which is mounted on the wall of the front shell 2. In the present embodiment, the piping 42 is not directly connected to the source, but is connected to the first piping 24 at a location downstream of the check valve 25.

A solenoid valve 43 is disposed in the second piping 42 for selectively communicating the second piping 42 with either the atmosphere or the source of negative pressure (namely, the first piping 24). The solenoid valve 43 is controlled by a controller, not shown, to be turned on and off, and in the inoperative condition shown in FIG. 1, the second piping 42 communicates with the source of negative pressure. Accordingly, a negative pressure is introduced into the internal space A' within the bellows 17 through the second piping 42.

By contrast, when the solenoid valve 43 is actuated by the controller, the atmosphere is introduced into the internal space A' within the bellows 17 through the second piping 42. Such atmosphere is also introduced into the both variable pressure chambers B, D through the first constant pressure passage 23, the valve mechanism 16 and the both variable pressure passages 27, 28. Accordingly, in the present embodiment, by actuating the solenoid valve 43 under the inoperative condition of the brake booster shown in FIG. 1, the booster can be operated without depressing a brake pedal, not shown, which is mechanically coupled to the input shaft 34.

OPERATION

In the normal condition of the brake booster, the solenoid valve 43 remains inactive as shown in FIG. 1, and accordingly, the negative pressure is introduced into the internal space A' within the bellows 17 through the second piping 42. The negative pressure is also introduced into the constant pressure chamber A through the first piping 24, and thus the negative pressure is introduced into all the chambers, A, B, C, D and A'.

When a brake pedal, not shown, is depressed under this inoperative condition, the input shaft 34 is driven to the left, whereupon the valve mechanism 16 switches a fluid circuit, introducing the atmosphere into the both variable pressure chambers B and D. This allows an output of a given servo ratio to be derived from the push rod 35 in generally same manner as a conventional brake booster of tandem type.

In distinction to the normal braking operation, when the brake booster described is to be operated as an automatic brake, the solenoid valve 43 may be actuated by the controller under the inoperative condition where the input shaft 34 shown in FIG. 1 is not driven forward. This allows the atmosphere rather than the negative pressure to be introduced into the internal space A' within the bellows 17, which atmosphere is also introduced into the both variable pressure chambers B and D through the first constant pressure passage 23 and its communicating first and second variable pressure passages 27 and 28. Accordingly, a pressure differential is developed between the both constant pressure chambers A, C and the both variable pressure chambers B, D, whereby a given output can be derived from the push rod 35 even though the brake pedal has not been depressed.

In the present embodiment, the bellows 17 includes a front end of an increased thickness to provide a front bead 17a and also a rear end of an increased thickness to provide a rear bead 17b. The front bead 17a is held in abutment against the wall surface of the front shell 2 by being urged by an inner peripheral portion of a support member 44 disposed within the constant pressure chamber A, which is effective to maintain a hermetic seal and to prevent a displacement of the front bead 17a. Outer peripheral portion of the support member 44 is disposed in overlapping relationship with the bead 11b extending around the outer periphery of the front diaphragm 11 and is held sandwiched between an annular wall 2a of the front shell 2 and an opposing wall 4a of the centerplate 4. The support member 44 is formed with a plurality of through-openings at selected positions to allow the negative pressure from the first piping 24 to be introduced into the constant pressure chamber A.

Figure 2:
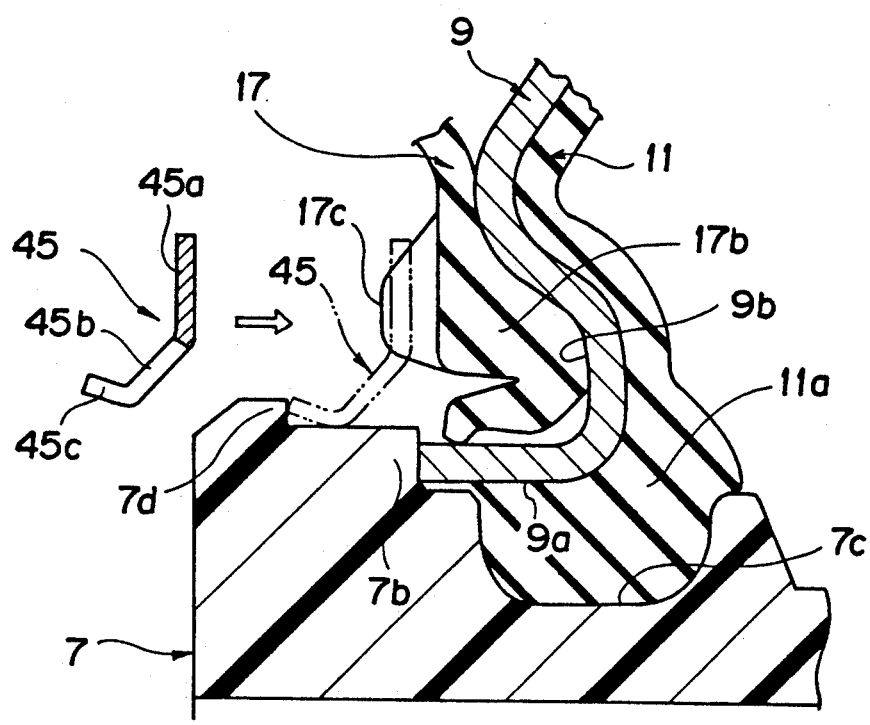
FIG. 2 is a fragmentary view, to an enlarged scale, of FIG. 1.

As shown to an enlarged scale in FIG. 2, the rear bead 17b of the bellows 17 is initially fitted around the outer periphery of the valve body 7 from the front side thereof, and is then held in abutment against the inner peripheral edge of the front power piston 9, such abutment being maintained by an annular retainer 45 which is snapped in place around the outer periphery of the valve body 7 from the front side to thereby prevent the disengagement of the bead 17b.

In the present embodiment, the inner peripheral edge of the power piston 9 is formed with a tubular portion 9a which extends axially forward and also with an annular recess 9b which continues from the tubular portion 9a and located radially outward thereof. When mounting the front power piston 9 on the valve body 7, the tubular portion 9a is fitted over the outer periphery of the valve body from the rear side until the tip of the tubular portion 9a abuts against a positioning step 7b formed on the outer periphery of the valve body 7. When so positioned, the inner peripheral surface of the tubular portion 9a is effective to maintain in place the bead 11a extending around the inner periphery of the front diaphragm 11 and which is fitted in an annular groove 7c formed in the valve body 7 at a location adjacent to the positioning step 7b, thereby connecting the front power piston 9 and the front diaphragm 11 to the outer periphery of the valve body 7.

The rear bead 17b of the bellows 17 is fitted into the annular recess 9b formed in the front power piston 9 and is held in abutment against it, and under this condition, the retainer 45 is snapped around the outer periphery of the valve body 7 to bear against the rear bead 17b, thereby preventing the disengagement thereof.

In the present embodiment, the rear bead 17b is formed with a plurality of forwardly extending projections 17c which are spaced apart circumferentially for abutment against the retainer 45.

Additionally, in the present embodiment, the outer periphery of the valve body 7 is formed with a locking step 7d at a location forward of the positioning step 7b, and the locking step 7d is engaged by the inner edge of the retainer 45, thus preventing the disengagement of the retainer 45 from the outer periphery of the valve body 7.

It will be seen that the retainer 45 used in the present embodiment comprises a radial portion 45a for abutment against the projections 17c on the rear bead 17b, a plurality of slanted claws 45b continuing radially inward from the radial portion 45a, and a forwardmost engaging portion 45c which is formed by folding outwardly the inner edge of the claws 45b at an obtuse angle, the engaging portion 45c engaging the locking step 7d on the valve body 7 to prevent the retainer 45 from being disengaged from the outer periphery of the valve body 7.

With the described construction, when the atmosphere is introduced into the internal space A' within the bellows 17, the entire bellows 17 will be expanded, whereby the front bead 17a and the rear bead 17b of the bellows 17 will be pulled both radially and axially. However, the front bead 17a is held in place by the support member 44 while the rear bead 17b is held by the combination of the annular recess 9b in the front power piston 9 and the retainer 45, whereby any displacement of the rear bead 17b, and accordingly, a consequent failure of the hermetic seal is prevented.

The provision of the plurality of projections 17c on the rear bead 17b for abutment against the retainer 45 is effective to prevent a failure of the hermetic seal as a result of any one or more of the projections 17c being damaged as by the abutment by the retainer 45 as the rear bead 17b is repeatedly pulled in the axial direction.

It is to be noted that a juncture between the engaging portion 45c, which is in effect the inner peripheral edge of the retainer 45, and the claws 45b is folded in a manner to provide a smooth curved surface in order to prevent any portion of the retainer 45 from ablating or damaging the outer periphery of the valve body 7 as a result of its sliding contact with such outer periphery when the retainer 45 is snapped in place around the valve body 7.

The engagement of the engaging portion 45c of the retainer 45 with the locking step 7d on the valve body 7 is effective to prevent the disengagement of the retainer 45 from the outer periphery of the valve body 7 in an advantageous manner.

It is to be noted that while the retainer 45 of the above embodiment is provided with the engaging portion 45c at its foremost position, such engaging portion 45c may be omitted, thus using only the radial portion 45a and the claws 45b to define the retainer 45. In this instance, the inner peripheral edge of the claws 45c may be chamfered smoothly to prevent the valve body 7 from being damaged.

SECOND EMBODIMENT

Figure 3:
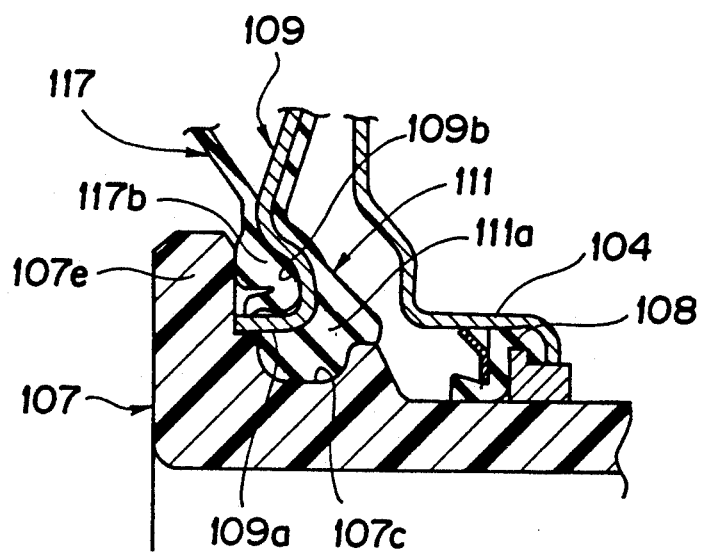
FIG. 3 is a longitudinal section of another embodiment of the present invention.

FIG. 3 shows a second embodiment of the invention. In this embodiment, the retainer 45 and the locking step 7d on the valve body 7 shown in the first embodiment are eliminated, and instead the outer periphery of a valve body 107 is formed with a flange 107e at its front end with most of a rear bead 117b of bellows 117 being surrounded by a rear end face of the flange 107e and an annular recess 109b formed in a front power piston 109 and thus is axially held sandwiched therebetween.

It is to be noted that in the second embodiment, the projections 17c on the rear bead 17b shown in the first embodiment are eliminated. In other respects, the arrangement is similar to that of the first embodiment, and accordingly corresponding parts are designated by like numerals as used in connection with the first embodiment to which 100 is added, instead of describing them in detail.

The arrangement of the second embodiment is also effective to prevent a displacement of the rear bead 117b when the bellows 117 is expanded while simultaneously preventing a failure of the hermetic seal in the region of the rear bead 117b. Since the retainer 45 and the locking step 7d on the valve body 7 are eliminated in the second embodiment, the number of parts used to construct the brake booster and the number of assembling operations are reduced by a corresponding amount, thus facilitating the assembly.

THIRD EMBODIMENT

Figure 4:
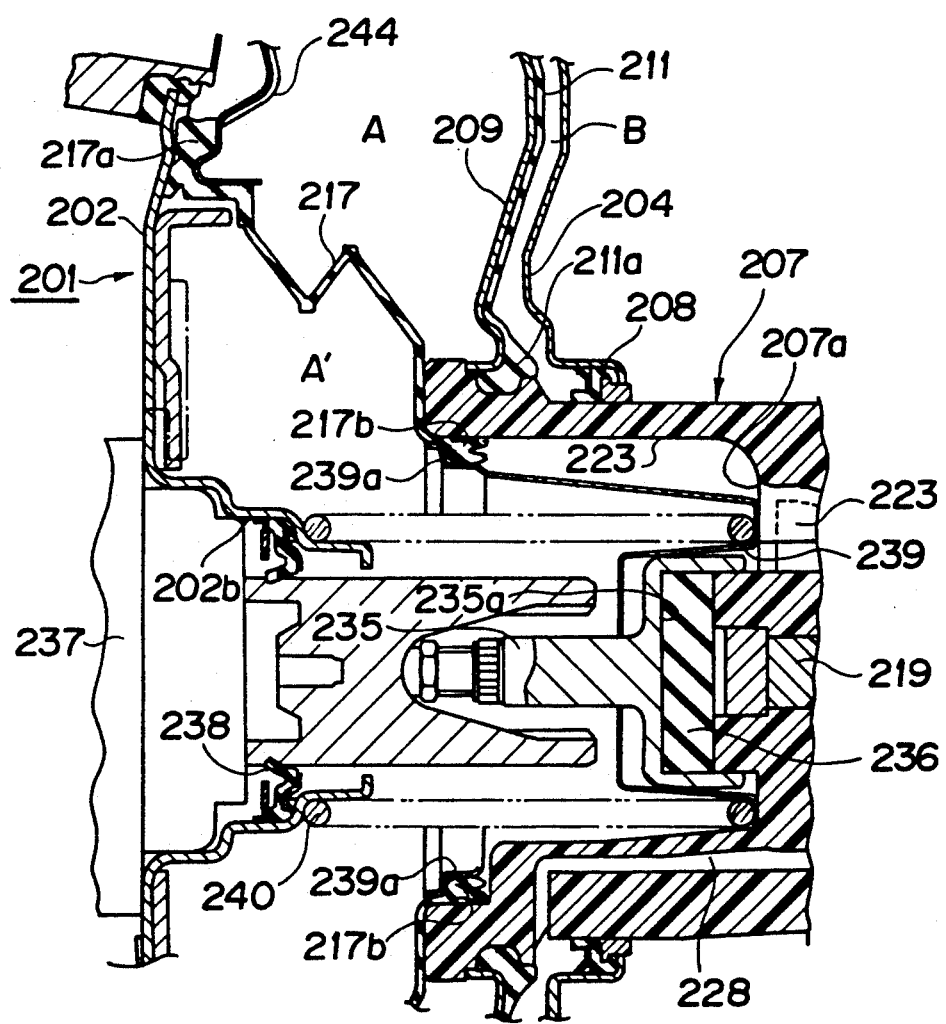
FIG. 4 is a longitudinal section of a further embodiment of the invention.

FIG. 4 shows a third embodiment of the invention. In the third embodiment, the retainer 45 and the locking step 7d on the valve body 7 shown in the first embodiment are again eliminated. Rather than connecting the rear bead 17b of the bellows 17 to the inner peripheral edge of the front power piston 9, bellows 217 includes a rear bead 217b which is connected to the inner periphery of a valve body 207 at its front end.

Specifically, the inner periphery of the valve body 207, which defines an opening located at the front end of a first constant pressure passage 223, has the rear bead 217b of the bellows 217 fitted therein, which is then held in place by a locking step 239a which is formed at the front end of a retainer 239. The retainer 239 includes a rear end, against which one end of a return spring 240 abuts and which is folded upon itself to extend axially forward with a gentle slant in it, the front end which represents the extremity of the slanted portion being formed with the locking step 239a. The locking step 239a comprises a radially extending stepped end face, a tubular portion of a greater diameter which is located forwardly of the stepped end face, and another tubular portion of a reduced diameter which is located rearward of the stepped end face. The entire locking step 239a is disposed in abutment against the inner periphery of the valve body 207 while retaining the inner end of the rear bead 217b therebetween, thus preventing the rear bead 217b from being disengaged toward the front side. In other respects, the arrangement is similar to that of the first embodiment, and corresponding parts are designated by like numerals as used in describing the first embodiment to which 200 is added.

Again, the third embodiment functions in the similar manner and achieves a similar effect as that achieved by the second embodiment. Since the rear bead 217b of the bellows 217 is connected to the inner periphery of the valve body 207 in the third embodiment, the volume of the rear bead 217b which is disposed within the constant pressure chamber A may be reduced, thus allowing the axial dimension of the bellows 217 itself to be reduced.

While the invention has been described above in connection with several embodiments thereof, it should be understood that the above disclosure is exemplary only and that a number of changes, modifications and substitutions therein will readily occur to one skilled in the art from the disclosure.

What is claimed is:

1. A brake booster including a valve body slidably disposed in a shell, a power piston mounted on the valve body, a constant and a variable pressure chamber formed across the power piston, a constant pressure passage formed in the valve body for providing a communication between the constant pressure chamber and a valve mechanism which switches a fluid circuit and for providing a communication between the constant pressure chamber and the variable pressure chamber through the valve mechanism and a variable pressure passage, and bellows disposed within the constant pressure chamber and having a rear opening connected to the constant pressure passage and a front end connected to the shell, with a negative pressure or an atmosphere being selectively supplied to an internal space within the bellows;

characterized in that a rear end of the bellows is formed as a bead having an increased thickness, and an annular recess is formed in an inner periphery of the power piston at its front end in which the bead of the bellows is fitted, an annular retainer being snapped in place around an outer periphery of the valve body from the front side so as to abut against the bead of the bellows, thereby preventing the disengagement of the bead of the bellows.

2. A brake booster according to claim 1 in which the bead of the bellows which is disposed for abutment against the retainer is formed with a plurality of forwardly extending projections.

3. A brake booster according to claim 1 in which the outer periphery of the valve body is formed with a locking step at its front end, an inner edge of the retainer being engaged with the locking step to prevent the disengagement of the bead of the bellows.

4. A brake booster according to claim 3 in which a diaphragm is applied to a back surface of the power piston, and an inner peripheral edge of the annular recess formed in the power piston is formed with a forwardly extending tubular portion, which is fitted around the outer periphery of the valve body from the rear side while simultaneously bringing a front end of the tubular portion into abutment against a positioning step formed in the outer periphery of the valve body from the rear side.

5. A brake booster according to claim 4 in which a bead extending around an inner periphery of the diaphragm is disposed as a press fit between the tubular portion in the power piston and an annular groove formed in the outer periphery of the valve body, thereby securing the tubular portion of the power piston to the outer periphery of the valve body.

6. A brake booster according to claim 1 in which the internal space within the bellows communicates with a source of negative pressure through a negative pressure introducing piping which is mounted on an front wall of the shell, with a solenoid valve disposed in the piping for selectively communicating the internal space with the atmosphere or the source.

7. A brake booster according to claim 1 in which the front end of the bellows is also formed as a bead having an increased thickness, which is held in abutment against the inner wall of the shell by a support member which is disposed within the constant pressure chamber.

8. A brake booster including a valve body slidably disposed in a shell, a power piston integrally connected to the valve body, a constant and a variable pressure chamber formed across the power piston, a constant pressure passage formed in the valve body for providing a communication between the constant pressure chamber and a valve mechanism which switches a fluid circuit and for providing a communication between the constant pressure chamber and the variable pressure chamber through the valve mechanism and a variable pressure passage, and bellows disposed within the constant pressure chamber and having a rear opening connected to the constant pressure passage and a front end connected to the shell, with a negative pressure or an atmosphere being selectively supplied to an internal space within the bellows;

characterized in that a rear end of the bellows is formed as a bead having an increased thickness and an inner periphery of the power piston is formed with an annular recess at its front end in which the bead of the bellows is fitted, an outer periphery of the valve body being formed with a flange at its front end which extends radially outward, the inner periphery of the power piston being fitted over the outer periphery of the valve body from the rear side while the bead of the bellows is fitted in the annular recess in the power piston to hold the bead of the bellows axially sandwiched between the annular recess in the power piston and a rear end face of the flange on the valve body, the inner periphery of the power piston under this condition being secured to the outer periphery of the valve body by securing means.

9. A brake booster according to claim 8 in which a diaphragm is applied to a back surface of the power piston, and an inner peripheral edge of the annular recess in the power piston is formed with a forwardly extending tubular portion, which is fitted over the outer periphery of the valve body from the rear side until a forward tip of the tubular portion abuts against the flange on the valve body from the rear side.

10. A brake booster according to claim 9 in which the securing means comprises an annular groove formed in the outer periphery of the valve body, and a bead extending around the inner periphery of the diaphragm which is a press fit between the annular groove and the tubular portion of the power piston.

11. A brake booster including a valve body slidably disposed in a shell, a power piston mounted on the valve body, a constant and a variable pressure chamber formed across the power piston, a valve mechanism disposed in the valve body for switching a fluid circuit, a constant pressure passage formed in the valve body and having a front end which opens into a front end face of the valve body and a rear end connected to the valve mechanism, a passage for providing a communication between the constant and the variable pressure chamber through the valve mechanism and a variable pressure passage, a spring extending across the shell and the valve body for urging the valve body rearward, and bellows disposed within the constant pressure chamber and having a rear opening connected to the constant pressure passage and a front end connected to the shell, with a negative pressure or an atmosphere being selectively supplied to an internal space defined within the bellows;

characterized in that a rear end of the bellows is formed as a bead having an increased thickness, which is fitted into an opening in the valve body which provides a front end of the constant pressure passage, the bead of the bellows which assumes such position being held in abutment against an inner peripheral surface of an opening in the valve body by means of a locking step formed on a front end of a retainer to prevent the bead from being disengaged in the forward direction, a rear end of the retainer being interposed between the spring and the valve body to be secured to the valve body.

12. A brake booster according to claim 11 in which the front end of the bellows is also formed as a bead having an increased thickness, which is held in abutment against an inner wall of the shell by a support member which is disposed within the constant pressure chamber.

* * * * *